United States Patent [19]
Turner

[11] Patent Number: 5,146,720
[45] Date of Patent: Sep. 15, 1992

[54] PIPE STABILIZER

[76] Inventor: Richard F. Turner, 310 Fox St., Ojai, Calif. 93023

[21] Appl. No.: 717,694

[22] Filed: Jun. 19, 1991

[51] Int. Cl.$^5$ .............................................. E04B 1/32
[52] U.S. Cl. ......................................... 52/98; 52/221; 249/214
[58] Field of Search ................ 52/699, 712, 713, 714, 52/715, 98, 160; 249/214, 41

[56] References Cited

U.S. PATENT DOCUMENTS

| | | | |
|---|---|---|---|
| 2,289,819 | 7/1942 | Wirtane | 249/214 |
| 3,469,815 | 9/1969 | Brennenman | 249/214 |
| 3,964,219 | 6/1976 | Hala | 52/699 |
| 4,324,078 | 4/1982 | Gray | 52/221 |
| 4,536,612 | 8/1985 | Domigan | 52/221 |

*Primary Examiner*—David A. Scherbel
*Assistant Examiner*—Creighton Smith
*Attorney, Agent, or Firm*—Kelly, Bauersfeld & Lowry

[57] ABSTRACT

A pipe stabilizer is provided for maintaining pipes in a fixed relationship relative to a support structure during building construction or repair. The stabilizer is used, for example, to hold ascending pipes in place when pouring concrete slab foundations, and to stabilize piping under floors and ceilings and between adjacent wall studs. The stabilizer includes a preformed plate and at least one removable pop-out impression to accommodate pipes of varying diameter. When secured to wall, ceiling or floor structures, openings are provided in the preformed plate which permit attachment of the stabilizer to wall studs, ceiling joists and the like by tie-wires. The stabilizer may also be positioned within a form for a concrete slab on rebar studs. In an alternative form of the invention, the plate includes an extension which can be nailed to a form board and broken away from the remainder of the plate when the form board is removed.

13 Claims, 2 Drawing Sheets

FIG. 5
FIG. 6
FIG. 7
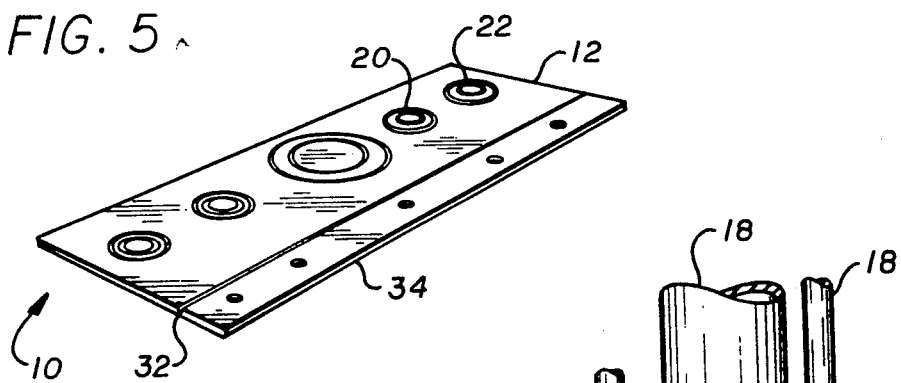
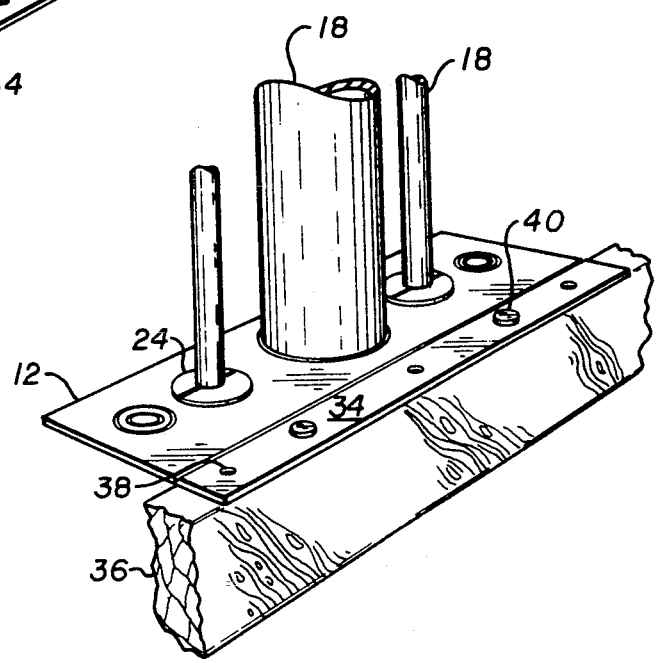
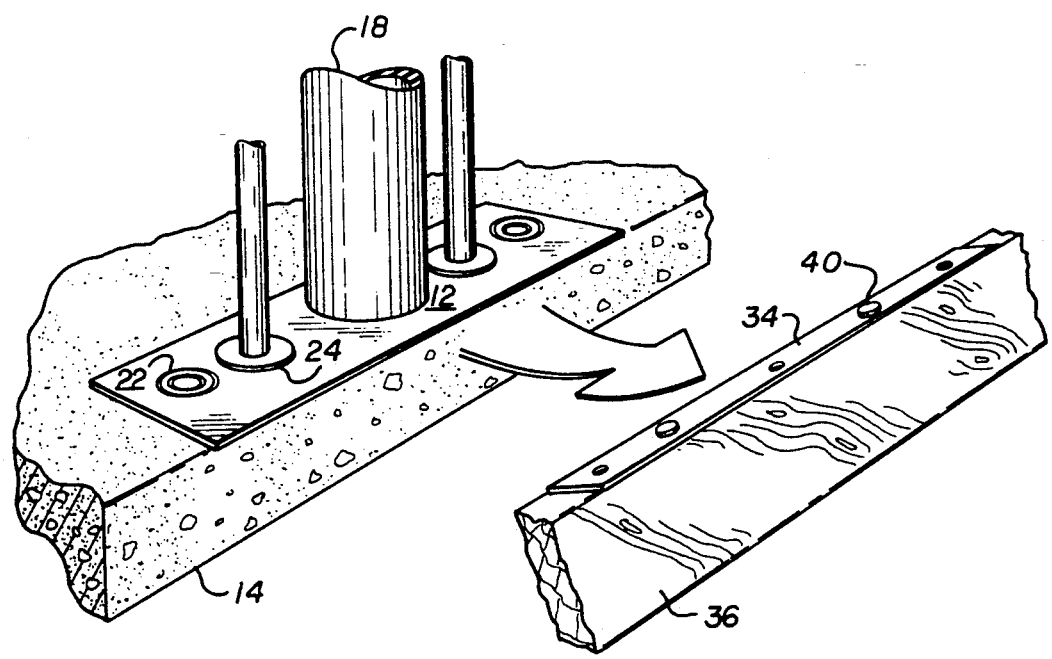

PIPE STABILIZER

FIELD OF THE INVENTION

The present invention relates generally to a construction device for installing plumbing. More specifically, this invention relates to a pipe stabilizer for securing, hanging, and aligning pipes in place during building construction or plumbing repair.

BACKGROUND OF THE INVENTION

In recent years, building construction has often occurred at a frenzied pace. Builders are faced with increasing costs and deadlines. Workmen trip over each other and equipment to complete the task at hand in a cost-efficient and expeditious manner. It is sometimes difficult for construction to proceed in an orderly fashion.

Plumbers are just one of the skilled workers needed to assist in constructing a building. In the working environment of a plumber, there are a substantial number of pipes which must be installed and fixed into any one place in accordance with good plumbing practices and governing laws, regulations and ordinances. In addition, there may be electrical wires running in the same place. This can create a tangle of pipes, wires, etc. In this same area, not only is the plumber and/or electrician working, there may also be the framer, a concrete laborer and others. With that number of people working in one area and in the haste to get things done, it is often the case that pipes get unintentionally moved out of position. They can also get moved out of position, for example, during the pouring of concrete. It is necessary to stabilize the pipe(s) to prevent movement which may work the pipe loose and out of the desired position. This stabilization is generally done by taping or tying the pipe to the wall or floor or other support in an area adjacent to the point of placement; a process which is both time-consuming and is not altogether stable. Other supports such as hangars and anchors have been used, but these have also proven unacceptable.

Although it is important to secure pipe, many construction personnel do not have the necessary time or skill to make a proper stabilizer using ordinary tape, string and wire. Even when the construction personnel have sufficient time and skill, such makeshift stabilizers do not work well since they too can be shifted out of place and the pipes can be tangled with each other.

Accordingly, there is a need for a novel pipe stabilizer which is of simplified construction, inexpensive to manufacture and easy to use. Such a stabilizer is needed which holds the pipes in a fixed relationship for proper placement and to minimize movement thereof. The present invention fulfills these needs and provides further related advantages.

SUMMARY OF THE INVENTION

According to the present invention and exemplary embodiments described herein, a pipe stabilizer is provided for use in securing pipes in place during building construction or plumbing repair. The pipe stabilizer generally comprises a preformed plate including at least one pop-out impression in which a pipe is positioned, and means for fastening the plate relative to a selected ceiling, floor or wall structure. The stabilizer may be used to stabilize and align horizontal, vertical and non-linear piping depending on the positioning of the preformed plate.

In a preferred embodiment, the preformed plate comprises a rigid rectangular plate made from ABS plastic, PVC (polyvinylchloride), or other suitable material. The plate is scored to form at least one circular impression that may be removed to define an opening in the plate through which the pipe is positioned. The openings can be of any diameter to accommodate pipes of varying sizes, and are often in the form of concentric circles to allow a choice among diameters. The opening may also accommodate a pipe insulator (commonly known as an "ISOLATOR") for increased pipe stability and efficiency. The pipe insulator is a split bushing. When using a pipe insulator, a smaller diameter pipe is used than without the pipe insulator.

The fastening means support the pipe relative to the selected ceiling, floor or wall structure, which may be, for example, ceiling and floor joists, wall studs, a concrete slab, etc. Such fastening means may include, for example, tie-wire, plumber's tape or the like. For the concrete slab, rebar may also be used.

In an alternative embodiment, scoring between an extension and the rest of the plate allows for a breakaway from a form board when the form board is no longer needed. This is especially useful when pouring a concrete slab foundation or in making prefabricated walls, or in any other instance where a form board is used. The scoring extends longitudinally in the plate from one end to another, and is typically aligned with an edge of the form. The extension may have a plurality of small openings to attach the plate to the form board utilizing nails.

Other features and advantages of the invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is a perspective view of an alternative embodiment of the pipe stabilizer, wherein a removable extension is provided along one edge of the plate;

FIG. 6 is an environmental view of the pipe stabilizer shown in FIG. 5, illustrating how the extension is nailed to a concrete slab form board; and FIG. 7 is an environmental view similar to that shown in FIG. 6, illustrating the manner in which the extension and the form board may be broken away from a concrete slab leaving the pipe stabilizer in place.

DETAILED DESCRIPTION OF THE PREFERRED EMBODIMENTS

Figure 1:
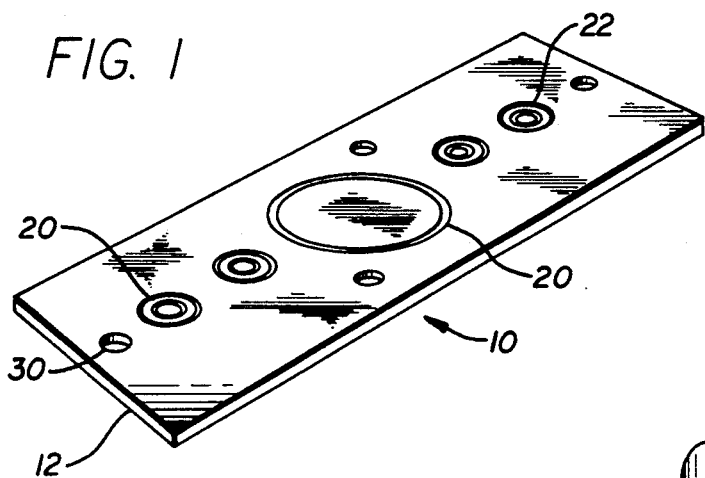
FIG. 1 is a perspective view of a pipe stabilizer embodying the present invention, illustrating a plurality of removable, pop-out impressions in a preformed plate.

As shown in the drawings for purposes of illustration, an improved pipe stabilizer referred to generally in FIG. 1 by the reference numeral 10, is provided for securing pipes in place during building construction or plumbing repair. The stabilizer is specifically designed to be of simplified construction, inexpensive to manufacture, and easy to use.

In accordance with the present invention, and as illustrated with respect to a first preferred embodiment in FIGS. 1-4, the pipe stabilizer 10 generally comprises a preformed plate 12 adapted to be used in connection with floor, ceiling, or wall structures, such as concrete slabs 14 (FIG. 2), and parallel supports 16 such as wall studs (FIG. 3) and ceiling and floor joists (FIG. 4), to stabilize pipes 18 running through or adjacent to such structures. The preformed plate 12 has a generally rectangular shape, and includes at least one removable, pop-out impression 20 to accommodate pipes 18 of varying diameters. The plate is preferably made from A.B.S. plastic from which most sewer, waste and vent piping is made. Of course, other materials may be used, such as PVC (polyvinyl-chloride) plastic or the like. The material should be sufficiently rigid and stable to withstand pipe vibrations over long periods of time. The material should be corrosion-proof or resistant, and easily machined to form the pop-out impressions.

The pop-out impressions 20 are formed by scoring the material of the plate 12. When removed, an opening is defined in the plate 12 through which a pipe 18 is inserted and positioned. The impressions 20 are most often scored in the form of concentric circles 22 so as to accommodate varying pipe diameters. For example, the center pop-out impression 20 may be sized to accommodate 3 inch, 2 inch or 1178 inch pipe 18 (sewer, waste & vent pipes, respectively). The pop-out impressions 20 on the sides may be smaller to accommodate smaller pipe 18 (for example, water). The impressions 20 are spaced according to common plumbing environments and requirements, and are usually aligned with each other on the plate 12 so that the pipes 18, when installed, are aligned.

Figure 3:
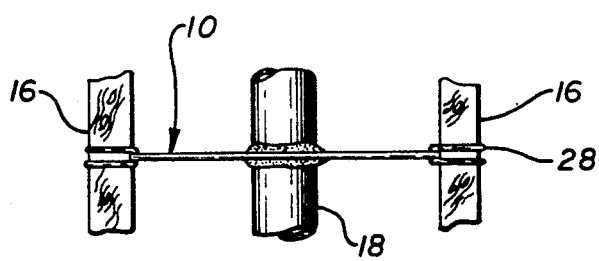
FIG. 3 is an elevational view of the pipe stabilizer shown in FIG. 1, illustrating the positioning of the pipe stabilizer between parallel vertical supports such as wall studs, to stabilize lengths of vertical piping.

The openings created by removal of the pop-out impressions 20 may also accommodate a pipe insulator 24 (commonly known as an "ISOLATOR") for increased pipe stability and efficiency (FIG. 3). The pipe insulator 24 is a split bushing. When using a pipe insulator, a smaller diameter pipe 18 is used than without the pipe insulator.

Figure 2:
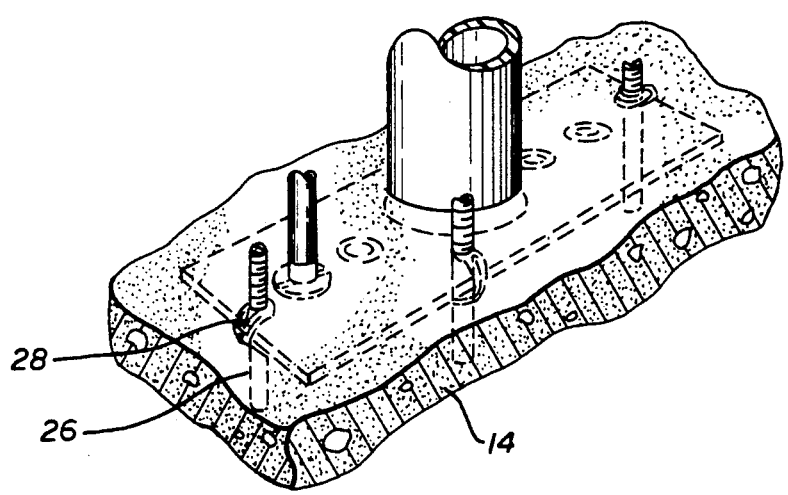
FIG. 2 is an environmental view of the pipe stabilizer shown in FIG. 1, illustrating its use in a concrete slab and secured to rebar by tie-wires.
Figure 4:
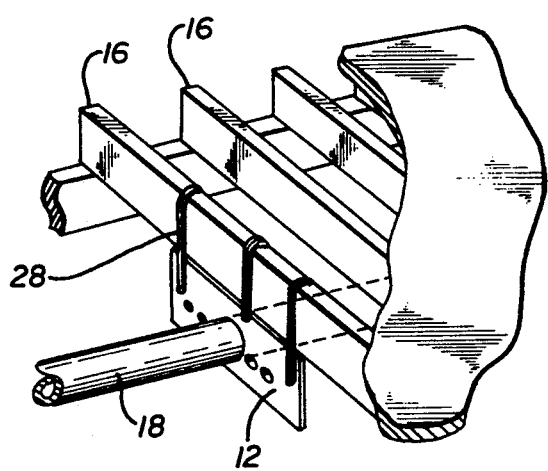
FIG. 4 is an environmental view of the pipe stabilizer shown in FIG. 1, illustrating the positioning of the pipe stabilizer beneath parallel horizontal supports such as joists, to stabilize lengths of horizontal piping.

FIG. 2 shows the plate 12 secured in a concrete slab 14 by rebar 26 and tie-wires 28. Prior to pouring the concrete slab 14, the plate 12 is secured to upwardly extending rebar studs 26. A plurality of openings 30 may be preformed in the plate, or drilled at the job site, through which the rebar studs 26 are passed. The plate 12 can be secured to the rebar 26 by means of the tie-wires 28 as shown, for holding the pipes 18 in place when the slab 14 is poured. The plate can also be positioned horizontally between parallel supports 16 such as wall studs (FIG. 3) to stabilize vertical piping. Additionally, the plate 12 may be hung beneath floor and ceiling joists to stabilize horizontal piping (FIG. 4).

The stabilizer 10 may be used to stabilize and align horizontal, vertical and even nonlinear piping 18 depending upon positioning of the stabilizer plate 12 relative to the floor, ceiling or wall structures. Although particular working environments have been described and illustrated, the positioning of the stabilizer plate 12 is not limited. The stabilizer 10 may be used in any manner necessary so long as the pipe 18 can be positioned through the selected opening and the plate 12 can be secured to the structures. In addition to rebar 26 and tie-wires 28, the stabilizer may be secured to the structures by the use of, for example, supporting blocks, nails or the like.

In a second preferred embodiment, as illustrated in FIGS. 5-7, scoring 32 between an extension 34 along the plate's longitudinal axis and the rest of the plate 12 allows for a breakaway from a form board 36 when the form board is no longer needed. This is especially useful when pouring a concrete slab foundation or in making prefabricated walls, or in any other instance where a form board 36 is used. The scoring 32 extends longitudinally in the plate 12 from one end to another and is typically aligned with an edge of the form 36. The extension 34 may have a plurality of small openings 38 to attach the plate 12 to the form board 36 utilizing nails 40.

The stabilizer 10 is used, for example, to hold ascending pipes 18 in place during ground construction, whether it be concrete slab foundation 14 or a raised floor foundation. The stabilizer 10 can also be used to hang and stabilize lengths of horizontal piping 18 under floors (FIG. 4) and ceilings, and between adjacent wall studs in walls or in any manner necessary to stabilize the piping. The stabilizer remains in place during the life of the building.

From the foregoing, it is to be appreciated that the pipe stabilizer 10 of the present invention is effective in keeping a number of pipes in a fixed relationship. The stabilizer thereby makes the plumber's job and the jobs of those working around him easier and saves time during construction. Although the invention has been described for the alignment of pipes, tubing or the like may also be aligned using the present invention.

Although two particular embodiments of the invention have been described in detail for purposes of illustration, various modifications of each may be made without departing from the spirit and scope of the invention. Accordingly, the invention is not to be limited, except as by the appended claims.

I claim:

1. A building system for stabilizing pipes, tubes or the like, comprising:
    a rigid preformed stabilizer plate having at least one removable pop-out impression which, when removed, defines an opening for the pipe, tube or the like;
    a supporting extension along one side of the plate;
    means for attaching the extension to the stabilizer plate along the one side thereof, wherein the attaching means provides a strong yet brittle connection between the extension and the plate such that the plate is broken away from the extension when forceably bent at the attaching means; and
    means for securing said extension to a selected ceiling, floor, or wall structure to support the plate in a cantilevered configuration relative to the selected ceiling, floor or wall structure.

2. The building system of claim 1, wherein said pop-out impression is in the form of concentric circles.

3. The building system of claim 2, wherein said impressions longitudinally extend along the preformed plate.

4. The building system of claim 1, wherein said pipe, tube or the like is further stabilized in the opening by a bushing.

5. The building system of claim 1, wherein said floor structure comprises a concrete slab that is poured into a construction form, the stabilizer plate being secured to the form prior to pouring of the concrete.

6. The building system of claim 1, wherein the attachment means is scoring.

7. The building system of claim 6, wherein the extension is secured to a construction form and the extension and form are broken away from the plate along the scoring when the form is removed.

8. A building system for stabilizing pipes, tubing or the like, comprising:
   a construction form board;
   a rigid preformed plate having at least one removable pop-out impression which, when removed, defines an opening for the pipe, tube or the like;
   a supporting extension attached along one side of the plate along a longitudinally extending score line;
   means for securing said extension to the construction form board so the score line is aligned with an edge of the form board to support the plate in a cantilevered configuration relative to the form board; and
   wherein the extension is broken away from the plate along the score line when the form board is removed leaving the plate to support the pipe, tube or the like.

9. A method of stabilizing a pipe, a tube or the like relative to a ceiling, floor or wall structure, the steps comprising:
   providing a stabilizer including a rigid preformed plate and at least one removable pop-out impression;
   an extension along one side of the plate and including means for attaching the extension along the one side of the plate wherein the attaching means provides a strong yet brittle connection between the extension and the plate;
   securing the extension to a form board relative to the ceiling, floor, or wall structure so the attaching means is aligned with an edge of the form board and the plate is cantilevered from the extension;
   removing the at least one impression to define a selected opening in the plate;
   positioning a selected pipe, tube or the like within the selected opening; and
   removing the form board and extension from the plate by forceably bending the extension relative to the plate along the attaching means thereby breaking off the form board and extension from the plate.

10. The method of claim 9, wherein said at least one impression is in the form of concentric circles, and wherein the stabilizer includes a plurality of such impressions extending longitudinally along the preformed plate.

11. The method of claim 10, wherein during the positioning step, an insulator is utilized to stabilize the pipe within the opening.

12. The method of claim 9, wherein the construction form board is utilized to define the limits of a concrete slab foundation, wherein the extension is secured to the form board prior to pouring of the concrete.

13. The method of claim 9, wherein the attaching means is scoring.

* * * * *

UNITED STATES PATENT AND TRADEMARK OFFICE
CERTIFICATE OF CORRECTION

PATENT NO.   : 5,146,720

DATED        : September 15, 1992

INVENTOR(S) : Richard F. Turner

It is certified that error appears in the above-identified patent and that said Letters Patent is hereby corrected as shown below:

Column 3, line 37, "1178" should read --1 1/2--.

Signed and Sealed this

Second Day of November, 1993

*Attest:*

BRUCE LEHMAN

*Attesting Officer*  *Commissioner of Patents and Trademarks*